United States Patent

[11] 3,607,873

| [72] | Inventors | John F. Ferguson<br>Ardsley, N.Y.;<br>Philip G. McCracken, Baton Rouge, La. |
|---|---|---|
| [21] | Appl. No. | 858,646 |
| [22] | Filed | Sept. 17, 1969 |
| [45] | Patented | Sept. 21, 1971 |
| [73] | Assignee | Geigy Chemical Corporation<br>Town of Greenburgh, N.Y. |

[54] PRODUCTION OF CYANURIC CHLORIDE
4 Claims, 1 Drawing Fig.

[52] U.S. Cl. ................................................... 260/248 C
[51] Int. Cl. ....................................................... C07d 55/42
[50] Field of Search ............................................ 260/248 C

[56] References Cited
UNITED STATES PATENTS
3,524,852  8/1970  Gruber et al.................. 260/248

*Primary Examiner*—John M. Ford
*Attorneys*—Karl F. Jorda, Bruce M. Collins and Martin J. Spellman, Jr.

ABSTRACT: A new and improved procedure is provided for effectively extending the life of the activated carbon catalyst used in producing cyanuric chloride from gaseous cyanogen chloride. In the process, the moist gaseous cyanogen chloride feed stream is contacted with calcium sulfate prior to its conversion to the desired cyanuric chloride product.

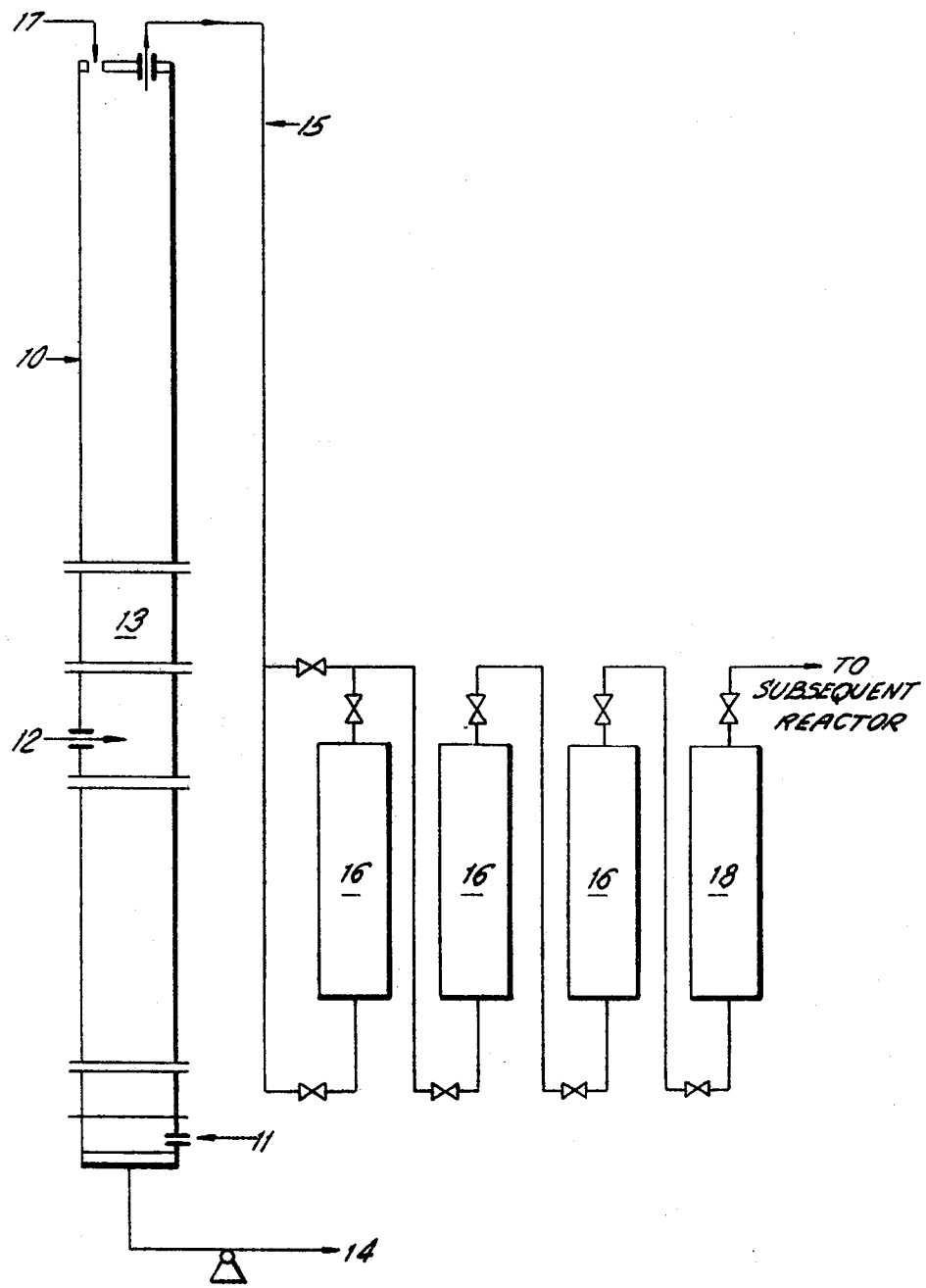

PRODUCTION OF CYANURIC CHLORIDE

FIELD OF THE INVENTION

This invention relates to a method for dramatically extending the life of an activated carbon catalyst used in producing cyanuric chloride, a useful chemical intermediate employed in the manufacture of many products such as, for example, chemotherapeutic agents, herbicides, dyes, brightening agents, synthetic resins, plastics, rubber, explosives and other materials.

In the production of cyanuric chloride, cyanogen chloride is treated with an activated carbon catalyst and using the process of the present invention, there is obtained a surprising and tremendous increase in the effective life of the catalyst system by contacting the starting gaseous cyanogen chloride with calcium sulfate.

SUMMARY OF THE INVENTION

The novel process of the present invention involves the treatment of moist gaseous cyanogen chloride with a suitable inert dehydrating agent prior to the trimerization step that is, prior to the conversion of the starting cyanogen chloride to the desired cyanuric chloride intermediate product. It has been found that there is a most surprising and unexpected increase in the life and of course effectiveness of the catalyst system when the moist cyanogen chloride, prior to the trimerization step, is contacted with calcium sulfate.

DETAILED DESCRIPTION OF THE INVENTION

The process for preparing cyanuric chloride by the conversion of gaseous cyanogen chloride is effected by heating cyanogen chloride, in a trimerizer, in the presence of an activated carbon catalyst at a temperature in excess of about 250° C. The reaction is represented by the following equation:

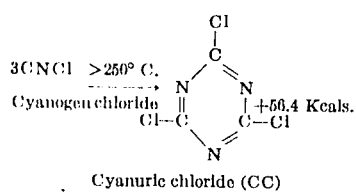

The reaction is conducted in the presence of a chlorinating agent such as chlorine or phosgene in an amount up to about 10 percent and suitably about 5 percent, based on the cyanogen chloride, in accordance with the procedure described in U.S. Pat. No. 3,312,697.

An illustrative activated carbon catalyst is the type disclosed in U.S. Pat. No. 3,018,288.

In the process, prior to treatment of the starting gaseous cyanogen chloride with the activated carbon catalyst, said cyanogen chloride is generally saturated with water vapor (at 20° C.) and entrained water and will usually contain as much as about 5,000 p.p.m. water. It was found that the activated carbon catalyst is adversely affected in the presence of substantial amounts of moisture that is, in the presence of 1,000–3,000 p.p.m. of water or higher, and consequently, when the cyanogen chloride was brought into contact with the activated carbon catalyst, the catalyst system could function effectively for only a very limited period of time. Thus, the life of the activated catalyst, when contacted with saturated cyanogen chloride, was of limited duration, i.e., from about 30 to 60 days, and consequently, replacement of the catalyst was constantly required. However, after contacting said cyanogen chloride with anhydrous calcium sulfate, there was obtained a tremendous and highly significant reduction in the water content of cyanogen chloride, i.e., as little as about 50 p.p.m. water and even less that is, down to about 10 p.p.m. water, and it was surprisingly found that in such a medium, the catalyst life was extended almost indefinitely so that is could effectively operate for periods in excess of 6 months and even in excess of 9 months.

The operation of a suitable form of the process of the present invention will be more fully apparent from consideration of the accompanying drawing illustrating one desirable system. In the drawing, a suitable reactor 10 such as, for example, a reactor in the nature of the described in U.S. Pat. No. 3,197,273, is employed and a chlorine gas stream 11 and a hydrogen cyanide stream 12 are charged into the reaction section 13 of the column. The hydrogen cyanide inlet is above that for the chlorine inlet. Sufficient water 17 is added at the top of the reactor to remove the byproduct HCl from the bottom 14 at a desired concentration. The gaseous cyanogen chloride and excess chlorine gas 15 are recovered in the overhead from the aforesaid reactor and since the product gas stream contains substantial amounts of water it is passed through suitable calcium chloride dehydrators 16 which are arranged in series and then through a calcium sulfate dryer 18. Removal of as much water as possible from the cyanogen chloride is essential as otherwise, the catalyst life or activity will be shortened considerably. It is highly desirable, in a continuous process, to avoid deactivation of the catalyst system and the need for frequent replacement of the catalyst.

Studies were conducted to determine the effectiveness of various drying agents for removing or reducing substantially the amount of water present in the cyanogen chloride gaseous stream. Silica gel, activated alumina, 76 percent and 93 percent sulfuric acid as well as superphosphoric acid (105 percent $H_3PO_4$) were tried but were found to be unsatisfactory because of their reactivity with cyanogen chloride. Molecular sieves were also found to be unsuitable because of their reactivity to cyanogen chloride causing hydrolysis thereof or other undesirable side reactions. Surprisingly, it was found that calcium sulfate was not only unreactive with cyanogen chloride but in addition, calcium sulfate was effective in substantially reducing the amount of water present in the cyanogen chloride to a level where the activated carbon catalyst could operate effectively for an indefinite period that is, for periods beyond 6 and even 9 months.

The following example will serve to illustrate an embodiment of the present invention and the example is therefore not to be considered as limitative.

EXAMPLE

To establish the correlation between moisture content of the cyanogen chloride stream and catalyst life, trimerizers are packed with fresh activated carbon catalysts just prior to starting the test procedure. The stream of cyanogen chloride gas to one trimerizer is dried with calcium chloride while the stream of cyanogen chloride gas to a second trimerizer is dried with both calcium chloride and calcium sulfate. The calcium sulfate is in the form of a 30-inch×8-foot bed, packed with 1/4 inch calcium sulfate and this bed is installed onstream between the calcium chloride driers and the trimerizers. There is also installed a thermocouple in the trimerizer tubes to measure the reaction temperature.

It is found that the catalyst system is deactivated due to moisture contamination. It is also found that when the cyanogen chloride gas is treated only with calcium chloride and not additionally with calcium sulfate, the catalyst life is limited that is, the catalyst system is effective for only about 30 to 60 days and the catalyst has to be replaced after this period.

However, when the cyanogen chloride gas stream is passed through a series of calcium chloride driers followed by contacting with calcium sulfate, it is possible to effectively reduce the moisture content of the cyanogen chloride to as low as 50 p.p.m. and even as low as 10 p.p.m. The catalyst life at this low moisture level is dramatically extended, i.e., the catalyst system functions effectively beyond a 6 or 9 month period and even longer.

It is therefore obvious that moisture content in the cyanogen chloride gas stream is directly associated with short catalyst life and there is highly significant increase in catalyst life when the cyanogen chloride gas is dried with calcium sulfate.

While the contact time of the gaseous cyanogen chloride with the calcium sulfate dryer is not believed to be critical, generally a contact time of between about 5 minutes and 10 minutes has been found to be suitable. Contact times in excess of the high portion of the aforesaid range did not offer any advantages.

The form of calcium sulfate does not appear to be critical as excellent results were obtained when the calcium sulfate was used, for example, in either supported powder or granular form.

Prior to the treatment with the calcium sulfate, it has been found that the moisture content of the gaseous cyanogen chloride varies between about 1,000 p.p.m. and 3,000 p.p.m. and even at times, as high as about 5,000 p.p.m. but following exposure to or contact with calcium sulfate, the moisture content of the cyanogen chloride is surprisingly reduced to about 50 p.p.m. or even less, i.e., to about 10 p.p.m. without affecting the cyanogen chloride. Concomitant with the reduction in moisture content, the life and effectiveness of the catalyst system is extended almost indefinitely.

It may thus be seen that the present invention provides an improved process for extending the catalyst life in the production of cyanuric chloride.

It will be understood however that various changes may be made in the preferred embodiments of the process described hereinabove; accordingly, the preceding description is intended as illustrative only and should not be considered in a limiting sense:

What is claimed is:

1. In a process for preparing cyanuric chloride by he conversion of gaseous cyanogen chloride in the presence of an activated carbon catalyst and at least about 0.5 percent of a chlorinating agent, the improvement comprising contacting the gaseous moist cyanogen chloride stream with anhydrous calcium sulfate prior to the trimerization.

2. A process according to claim 1 wherein the gaseous cyanogen chloride stream is first contacted with calcium chloride.

3. A process according to claim 1 wherein the contact time of the anhydrous calcium sulfate with the gaseous cyanogen chloride stream varies between about 5 minutes and 10 minutes.

4. A process according to claim 3 wherein the moisture content of the cyanogen chloride gaseous stream is reduced to about 50 p.p.m. or less.